United States Patent Office 3,478,086
Patented Nov. 11, 1969

3,478,086
SEPARATION OF TETRACHLOROTEREPHTHALIC ACID DERIVATIVES
Alexis J. Rudnitzki and David I. Templer, Chicago, Ill., assignors to Velsicol Chemical Corporation, a corporation of Delaware
No Drawing. Filed Aug. 6, 1965, Ser. No. 477,936
Int. Cl. C07c 69/82, 67/06
U.S. Cl. 260—475
8 Claims

ABSTRACT OF THE DISCLOSURE

A process for separating a monoalkyl tetrachloroterephthalate from a mixture containing tetrachloroterephthalic acid which comprises forming an aqueous solution of water soluble salts of the acids and lowering the pH of the solution to at least about 1.5.

---

This invention relates to the separation of esters of tetrachloroterephthalic acid from tetrachloroterephthalic acid. In particular this invention relates to the separation of monoalkyl esters of tetrachloroterephthalic acid from mixtures containing tetrachloroterephthalic acid.

It is further concerned with the separation of monoalkyl esters of tetrachloroterephthalic acid from mixtures containing tetrachloroterephthalic acid and dialkyl esters of tetrachloroterephthalic acid.

Since tetrachloroterephthalic acid is a dibasic acid it is relatively difficult to prepare its monoester. Attempts to prepare these monoesters inevitably result in mixtures of the monoester, diester and in many instances the diacid.

Since the monoester is an important intermediate in the production of valuable chemicals (e.g. mixed esters), it is desirable to have available procedures for obtaining it in relatively high purity (98% or better) and in recovering quantitative amounts of it from mixtures containing either the diacid and/or the diester. Such procedures should be relatively straightforward so as to eliminate the need for expensive equipment and should produce products of sufficiently high purity that they can be directly used in subsequent reactions without additional purification steps.

Accordingly, it is an object of the present invention to devise a procedure for separating monoalkyl esters of tetrachloroterephthalic acid from mixtures containg tetrachloroterephthalic acid.

It is another object of the present invention to devise a procedure for separating the monoalkyl ester of tetrachloroterephthalic acid from mixtures containing tetrachloroterephthalic acid and dialkyl esters of tetrachloroterephthalic acid.

Still another object of the present invention is to devise a procedure for recovering substantially pure monoesters of tetrachloroterephthalic acid from mixtures containing tetrachloroterephthalic acid and diesters of tetrachloroterephthalic acid.

Still another object of the present invention is to devise a procedure for obtaining substantially pure monoalkyl esters of tetrachloroterephthalic acid in substantially quantitative yields from mixtures containing tetrachloroterephthalic acid.

Still another object of the present invention is to devise a procedure for obtaining substantially pure monoalkyl esters of tetrachloroterephthalic acid in substantially quantitative yields from mixtures containing tetrachloroterephthalic acid and dialkyl esters of tetrachloroterephthalic acid.

Still other objects of the present invention will become apparent from the ensuing description.

It has now been determined that a monoalkyl ester of tetrachloroterephthalic acid can be separated from aqueous solutions of the salts of the tetrachloroterephthalic acid. By the present means the monoester is obtained in purities of 98% and higher. This process results in yields of at least 90% by weight of the monoester available in the mixture.

In essence the present process involves forming an aqueous solution of the salts and controlling the pH in such a manner that the monoester is preferentially separated from the solution.

In order to obtain the desired aqueous solution, it is preferred to prepare a solution of a water soluble salt of the acids. While a variety of water soluble salts can be formed, as a practical matter the sodium and potassium salts are the most economically and most easily prepared. While the concentration of the solution is not critical, there is no need to use excess water but it is necessary to have a true solution. These solutions can easily be obtained by mixing the acids with water and potash or caustic soda as is generally accepted in the art for the formation of salts of acids.

Once the solution is obtained it is then necessary to lower its pH by the addition of an acid. Normally any mineral acid such as hydrochloric or sulfuric acid will suffice. In order to obtain the high purity monoalkyl ester in the maximum amounts, the pH should be lowered to at least about 1.5. Optimum yields of high purity monoalkyl ester are obtained by lowering the pH to between about 0.7 and 1.2. By using this procedure it has been found that the monoalkyl ester can be separated from the tetrachloroterephthalic acid to such a high degree as to produce a product that will analyze at least 98% monoalkyl ester and normally 99% monoalkyl ester is readily obtained.

Not only does this procedure result in a 99% pure product, it also recovers from the starting mixture a minimum of about 90% of the available monoalkyl ester. Naturally the solution from which the monoalkyl ester has been separated will be enriched to a point of containing relatively large amounts of the tetrachloroterephthalic acid. This solution can, if desired, be recirculated so as to recover monoalkyl esters remaining in it or otherwise utilize the tetrachloroterephthalic acid.

Generally the esterification of tetrachloroterephthalic acid by the various means described in the literature produces a three component mixture of unreacted tetrachloroterephthalic acid, monoalkyl ester of tetrachloroterephthalic acid and diester of tetrachloroterephthalic acid. The proportion of these components in the product will vary with the process used for their preparation. Often the percentage of the esters produced will be between 40 and 60% monoester and 40 and 60% diester. It is therefore also an embodiment of the present invention not only to separate the two acids from each other but also to separate off the diester.

When using the present process to separate this three component mixture the following procedure is employed:

The mixture is diluted with sufficient water so as to form a solution of the salts of the acids when potash or caustic soda is added to obtain a pH between about 5 and about 10. The sole requirement on the pH adjustment is that the solution not be too alkaline as to be able to saponify the diester and not to be too acid so that the salts will not be soluble. Solutions having a neutral pH are useful for this purpose.

Once a solution of the salts of the acids is obtained, it is found that the insoluble diester can be readily separated therefrom. Various procedures for separating insoluble material from water solutions can be employed with filtration of the solution being an acceptable means. If desired, the diester can be extracted from the solution by the use of a non-polar solvent such as benzene, toluene, xylene, etc.

Once the insoluble diester has been separated from the mixture it is then necessary to lower the pH of the neutral solution to at least 1.5. While hydrochloric acid and sulfuric acid are readily available and easily used in this procedure, other acids can be employed.

As described previously, once the pH of this solution is lowered to this pH range the monoester of tetrachloroterephthalic acid is preferentially separated from the solution and readily recovered in high purity yields. This separation can be accomplished by filtration or extraction with a non-polar solvent such as benzene, xylene, toluene, etc.

The following examples illustrate the performance of the present process.

EXAMPLE 1

Separation of dimethyl tetrachloroterephthalate from the salts of tetrachloroterephthalic acid and monomethyl tetrachloroterephthalate Monomethyl tetrachloroterephthalate (6.8 g.), tetrachloroterephthalic acid (5.2 g.), dimethyl tetrachloroterephthalate (3.8 g.) and water (100 ml.) were placed in a glass reaction flask equipped with a stirrer, heating mantle, thermometer and reflux condenser and heated to 75° C. Sodium hydroxide (3.05 ml. of a 50% solution; 0.2 ml. of a 2.5 N solution and 1.3 ml. of 0.1 N solution) was added to the mixture. The pH of the solution was found to be 6.5. Benzene (3 ml.) was added. The solution was brought to reflux, the benzene removed by azeotropic distillation and the solution was cooled to 75° C. The hot solution was filtered and the filter cake was washed with hot water (100 ml.). The filter cake was analyzed and found to contain 97% dimethyl tetrachloroterephthalate and 3% monomethyl tetrachloroterephthalate.

EXAMPLE 2

Separation of monomethyl tetrachloroterephthalate from the salt of tetrachloroterephthalic acid Water (110 ml.), tetrachloroterephthalic acid (4.0 g.), monomethyl tetrachloroterephthalate (8 g.) and toluene (32 ml.) were placed in a glass reaction flask equipped with a heating mantle, stirrer, reflux condenser and thermometer. The slurry was heated to 68° C. and sodium hydroxide (2.73 ml. of a 50% solution) was added to the mixture. The pH of the aqueous solution was found to be 7.80 and the temperature was increased to 74° C. Concentrated hydrochloric acid (2.64 ml.) was added to the mixture lowering its pH to 1.32. A sample was withdrawn from the toluene phase and analyzed after removal of the solvent to be 100% monomethyl tetrachloroterephthalate.

Additional hydrochloric acid (0.32 ml.) was added to the remaining 2-phase system maintaining it at a temperature of 74° C. and this was found to lower the pH of the aqueous solution to 1.11. A sample of the toluene layer was analyzed and found after removal of the toluene to contain 100% monomethyl tetrachloroterephthalate. A sample of the water layer was analyzed after evaporation of the water and found to analyze 10% monomethyl tetrachloroterephthalate and 90% tetrachloroterephthalic acid.

Hydrochloric acid (0.16 ml.) was added to the mixture being maintained at a temperature of 75° C. and this was found to lower the pH to 1.01. The toluene phase after removal of the toluene was found to analyze 99% monomethyl tetrachloroterephthalate and 1% tetrachloroterephthalic acid. The water layer after evaporation analyzed 7% monomethyl tetrachloroterephthalate and 93% tetrachloroterephthalic acid.

Additional hydrochloric acid (0.22 ml.) was added to the remaining mixture and this lowered its pH to 0.90. A sample of the toluene layer after removal of the toluene analyzed 99% monomethyl tetrachloroterephthalate and 1% tetrachloroterephthalic acid. A sample of the water layer after evaporation of the water analyzed 7% monomethyl tetrachloroterephthalate and 93% tetrachloroterephthalic acid.

Additional hydrochloric acid (0.37 ml.) was added to the mixture and this lowered the pH to 0.69. A sample of the toluene layer after removal of the toluene analyzed 98% monomethyl tetrachloroterephthalate and 2% tetrachloroterephthalic acid. A sample of the water layer after evaporation of the water analyzed 5% monomethyl tetrachloroterephthalate and 95% tetrachloroterephthalic acid.

EXAMPLE 3

Separation of monomethyl tetrachloroterephthalate from the salt of tetrachloroterephthalic acid Monomethyl tetrachloroterephthalate (6.03 g.), tetrachloroterephthalic acid (5.60 g.) and water (100 ml.) were placed in a glass reaction flask equipped with a heating mantle, stirrer, reflux condenser and thermometer. The mixture was heated to 60° C. and toluene (38.7 ml.) and sodium hydroxide (2.97 ml. of a 50% solution) were added. The pH of the aqueous solution was found to be 7.8. The pH of the solution was then lowered in increments by the addition of hydrochloric acid and the toluene and water layers analyzed as set forth in Example 2 with the following results:

After hydrochloric acid (2.00 ml.) had been added the pH of the aqueous solution was 1.30. The toluene phase after removal of the toluene was found to contain 100% monomethyl tetrachloroterephthalate. The water layer after evaporation of the water contained 11% monomethyl tetrachloroterephthalate and 89% tetrachloroterephtalic acid.

Additional hydrochloric acid (0.20 ml.) lowered the pH of the solution to 1.0. The toluene layer after removal of the toluene was found to contain 100% monomethyl tetrachloroterephthalate. The water layer after evaporation of the water was found to contain 7% monomethyl tetrachloroterephthalate and 93% tetrachloroterephthalic acid.

Additional hydrochloric acid (0.12 ml.) was added lowering the pH of the aqueous solution to 0.92. The toluene layer after removal of the toluene was found to contain 100% monomethyl tetrachloroterephthalate. The water layer after evaporation of the water was found to contain 7% monomethyl tetrachloroterephthalate and 93% tetrachloroterephthalic acid.

Additional hydrochloric acid (0.26 ml.) was added lowering the pH of the mixture to 0.80. The toluene layer after removal of the toluene was found to contain 100% monomethyl tetrachloroterephthalate. The water layer after evaporation of the water was found to contain 6% monomethyl tetrachloroterephthalate and 94% tetrachloroterephthalic acid.

EXAMPLE 4

Separation of monomethyl tetrachloroterephthalate from tetrachloroterephthalic acid and dimethyl tertachloroterephthalate Water (3,020 lbs.), potassium hydroxide (169 lbs. of a 45% aqueous solution), tetrachloroterephthalic acid (89 lbs.), monomethyl tetrachloroterephthalate (233 lbs.) and dimethyl tetrachloroterephthalate (101 lbs.) were placed in a reactor equipped with stirrer, reflux condenser and distillate recovery means. Additional potassium hydroxide (18 lbs. of a 45% aqueous solution) was added making the pH of the slurry 6.0. Benzene (10 gals.) was added to the reaction mixture and then removed by steam distillation. The reaction mixture was cooled to room temperature and filtered. The filter cake containing the dimethyl tertachloroterephthalate was washed and dried yielding 90 lbs. of product. The filtrate (395 gals.) was recovered.

A portion of the filtrate (195 gals.) was placed in a reactor equipped with stirrer and heating means. Toluene (46.3 gals.) was added to the solution. Its temperature was then raised to 175° F. with stirring and concentrated hydrochloric acid (7¾ gals.) was added making the pH of the solution 1.08. Agitation was discontinued. The water was separated from the toluene layer. Toluene (46.3 gals.) and a portion of the filtrate (200 gals.) were added to the reactor. This mixture was heated to 175° F. with continuous stirring. Hydrochloric acid (8 gals.) was added making the pH of the solution 0.90. Stirring was discontinued and the water layer was separated from the toluene layer which was added to the toluene layer from the first extraction. After removal of the toluene it was determined that the product (185 lbs.) contained 98.7% monomethyl tetrachloroterephthalate and 1.3% terachloroterephthalic acid.

EXAMPLE 5

Separation of monomethyl terachloroterephthalate from tetrochloroterephthalic acid and dimethyl tetrachloroterephthalate Water (566 lbs.), dimethyl tetrachloroterephthalate (15.3 lbs.), monomethyl tetrachloroterephthalate (446 lbs.) and tetrachloroterephthalic acid (22 lbs.) were placed in a reactor equipped with stirrer, reflux condenser and distillate recovery means. Sufficient potassium hydroxide (45% aqueous solution) was added to make the pH 6.0. Benzene (1 gal.) was added to the mixture and then removed by steam distillation. The mixture was cooled to room temperature and then filtered. The dry filter cake consisted of dimethyl tetrachloroterephthalate (17.2 lbs.)

The filtrate (605 lbs.) was placed in a reactor equipped with stirrer and heating means. Toluene (10 gals.) was added to the reactor and the mixture was heated to 180° F. with continuous stirring. Concentrated hydrochloric acid was added making the pH of the mixture 1.0. Agitation was discontinued and the water layer separated from the toluene layer. After removal of the toluene, the product (17.2 lbs.) was obtained and found to contain 99% monomethyl tetrachloroterephthalate.

EXAMPLE 6

Separation of monomethyl tetrachloroterephthalate from tetrachloroterephthalic acid and dimethyl tetrachloroterephthalate Water (4,880 lbs.), sodium hydroxide (119 lbs. of a 50% aqueous solution), tetrachloroterephthalic acid (108 lbs.), monomethyl tetrachloroterephthalate (248 lbs.) and dimethyl tetrachloroterephthalate (112 lbs.) were placed in a reactor equipped with stirrer, reflux condenser and distillate recovery means. Concentrated hydrochloric acid and additional sodium hydroxide were added to the slurry making its pH 8.6. Benzene (10 gals.) was added and then removed by steam distillation. The mixture was cooled to 175° F. filtered and the dried filter cake contained the dimethyl tertachloroterephthalate. Half of the filtrate (316 gals.) was placed in a reactor equipped with stirrer and heating means. Toluene (49.5 gals.) was added and the mixture heated to 175° F. (Concentrated hydrochloric acid (6⅔ gals.) was added making the pH 1.06. Agitation was discontinued and the water layer separated from the toluene layer. The toluene layer was combined with that from the first extraction. After removal of the toluene, the product (181 lbs.) conaining 99% of monoethyl tetrachloroterephthalate was obtained.

While the foregoing examples were performed using the methyl esters of tetrachloroterephthalic acid in combination with the acid itself, it is understood that the present process is equally operable with other esters of tetrachloroterephthalic acid. Commercially this would be important mainly with lower alkyl esters particularly the ethyl, propyl, isopropyl and butyl esters of tetrachloroterephthalic acid.

We claim:
1. A process for separating a monoalkyl tetrachloroterephthalate from a mixture containing tetrachloroterephthalic acid which comprises forming an aqueous solution of water soluble salts of the acids at a pH between about 5 and about 10, lowering the pH of the solution to at least about 1.5 and separating the insoluble monoalkyl tetrachloroterephthalate by filtering it from the aqueous solution or extracting it with a non-polar solvent selected from the group consisting of benzene, toluene and xylene.

2. A process for separating a monoalkyl tetrachloroterephthalate from a mixture containing tetrachloroterephthalic acid which comprises forming an aqueous solution of water soluble salts of the acids at a pH between about 5 and about 10, lowering the pH of the solution to at least about 1.5 by adding a mineral acid thereto and separating the insoluble monoalkyl tetrachloroterephthalate by filtering it from the aqueous solution or extracting it with a non-polar solvent selected from the group consisting of benzene, toluene and xylene.

3. A process for separating a monoalkyl tetrachloroterephthalate from a mixture containing tetrachloroterephthalic acid which comprises forming an aqueous solution of water soluble salts of the acids at a pH between about 5 and about 10, lowering the pH of the solution to between about 0.7 to 1.2 by adding a mineral acid thereto and separating the insoluble monoalkyl tetrachloroterephthalate by filtering it from the aqueous solution or extracting it with a non-polar solvent selected from the group consisting of benzene, toluene and xylene.

4. A process for separating monomethyl tetrachloroterephthalate from a mixture containing tetrachloroterephthalic acid which comprises forming an aqueous solution of water soluble salts of the acids at a pH between about 5 and about 10, lowering the pH of the solution to at least about 1.5 and separating the insoluble monoalkyl tetrachloroterephthalate by filtering it from the aqueous solution or extracting it with a non-polar solvent selected from the group consisting of benzene, toluene and xylene.

5. A process for separating monomethyl tetrachloroterephthalate from a mixture containing tetrachloroterephthalic acid which comprises forming an aqueous solution of water soluble salts of the acids at a pH between about 5 and about 10, lowering the pH of the solution to at least about 1.5 by adding a mineral acid thereto and separating the insoluble monoalkyl tetrachloroterephthalate by filtering it from the aqueous solution or extracting it with a non-polar solvent selected from the group consisting of benzene, toluene and xylene.

6. A process for separating monomethyl tetrachloroterephthalate from a mixture containing tetrachloroterephthalic acid which comprises forming an aqueous solution of water soluble salts of the acids at a pH between about 5 and 10, lowering the pH of the solution to between about 0.7 and 1.2 by adding a mineral acid thereto and separating the insoluble monoalkyl tetrachloroterephthalate by filtering it from the aqueous solution or extracting it with a non-polar solvent selected from the group consisting of benzene, toluene and xylene.

7. A process for separating a monoalkyl tetrachloroterephthalate from a mixture containing tetrachloroterephthalic acid and a dialkyl tetrachloroterephthalate which comprises forming an aqueous solution of water soluble salts of the acids at a pH between about 5 and about 10, separating the water insoluble dialkyl ester therefrom by filtering or extracting with a non-polar solvent selected from the group consisting of benzene, toluene and xylene, lowering the pH of the aqueous solution to at least about 1.5 and separating the monoalkyl tetrachloroterephthalate therefrom by filtering or extracting with a non-polar solvent selected from the group consisting of benzene, toluene, and xylene.

8. A process for separating monomethyl tetrachloroterephthalate from a mixture containing tetrachloroterephthalic acid and dimethyl tetrachloroterephthalate which comprises forming an aqueous solution of water soluble salts of the acids at a pH between about 5 and about 10, separating the water insoluble dimethyl tetrachloroterephthalate from the water solution by filtering or extracting with a non-polar solvent selected from the group consisting of benzene, toluene and xylene, lowering the pH of the water solution to at least about 1.5 by adding a mineral acid thereto and recovering the monomethyl tetrachloroterephthalate therefrom by filtering or extracting with a non-polar solvent selected from the group consisting of benzene, toluene and xylene.

References Cited

Vogel, Practical Organic Chemistry, 3rd ed., John Wiley & Sons, New York (1957), pp. 150–151.

JAMES A. PATTEN, Primary Examiner

E. J. SKELLY, Assistant Examiner